United States Patent
Deppert

[11] Patent Number: 6,105,739
[45] Date of Patent: Aug. 22, 2000

[54] GUIDE BUSHING

[75] Inventor: Norbert Deppert, Gochsheim, Germany

[73] Assignee: Mannesmann Sachs AG, Schweinfurt, Germany

[21] Appl. No.: 09/031,408

[22] Filed: Feb. 26, 1998

[30] Foreign Application Priority Data

Feb. 26, 1997 [DE] Germany .................. 197 07 632

[51] Int. Cl.[7] .................................. F16F 9/36
[52] U.S. Cl. .................. 188/322.17; 92/165 R; 92/167
[58] Field of Search ............... 187/322.17, 322.16, 187/269, 314, 315, 318, 322.13, 321.11; 267/129, 127; 92/165 R, 167, 168; 74/18.2; 384/16; 277/589, 563, 565, 500, 549, 576, 575, 925

[56] References Cited

U.S. PATENT DOCUMENTS

| | | |
|---|---|---|
| 1,022,341 | 4/1912 | Sullivan . |
| 3,238,601 | 3/1966 | White ........................ 29/149.5 |
| 4,482,036 | 11/1984 | Wössner et al. ........... 188/322.17 |
| 4,736,824 | 4/1988 | Dony et al. ............... 188/322.17 |
| 4,955,460 | 9/1990 | Lizell et al. .............. 188/322.17 |
| 5,098,071 | 3/1992 | Umetsu .................... 188/322.17 |

FOREIGN PATENT DOCUMENTS

| | | |
|---|---|---|
| 0 246 972 | 5/1987 | European Pat. Off. . |
| 0 250 956 | 6/1987 | European Pat. Off. . |
| 1 690 015 | 10/1954 | Germany . |
| 1 884 118 | 12/1963 | Germany . |
| 1 430 564 | 12/1968 | Germany . |
| 29 10 350 | 2/1980 | Germany . |
| 29 05 928 A1 | 8/1980 | Germany . |
| 80 29 322 U1 | 2/1981 | Germany . |
| 29 43 711 | 5/1981 | Germany . |
| 33 18 967 | 2/1984 | Germany . |
| 34 45 461 C1 | 6/1986 | Germany . |
| 94 15 921 U1 | 3/1996 | Germany . |
| 195 01 792 A1 | 8/1996 | Germany . |
| 58-28032 | 2/1983 | Japan ................. 188/322.17 |
| 59-212548 | 12/1984 | Japan ................. 188/322.17 |
| 59-212549 | 12/1984 | Japan . |
| 61-136031 | 6/1986 | Japan . |
| 240510 | 5/1946 | Switzerland . |

*Primary Examiner*—Douglas C. Butler
*Attorney, Agent, or Firm*—Cohen, Pontani, Lieberman & Pavane

[57] ABSTRACT

The invention relates to a guide bushing between two components axially movable relative to each other, especially for guiding a piston rod subjected to longitudinal and transverse forces in the region of a piston rod seal of a hydropneumatic vibration damper. The guide bushing encompasses the piston rod, is held axially in a piston rod guide and is made of a material having good gliding characteristics. The guide bushing is arranged in the piston rod guide with a radial clearance having a gap with a changeable width when the piston rod is subjected to transverse forces created between the receptacle diameter of the piston rod guide and the outer diameter of the guide bushing.

14 Claims, 4 Drawing Sheets

GUIDE BUSHING

BACKGROUND OF THE INVENTION

1. Field of the Invention

The invention relates to a guide bushing between two components that are axially movable relative to each other, especially for guiding a piston rod subjected to longitudinal and transverse forces of a hydropneumatic vibration damper.

2. Description of the Related Art

A guide bushing of this type is disclosed, for example, in German reference DE 29 05 928 A1. In this reference, the guide bushing is pressed into the piston rod guide. The pressure joint in which the guide bushing is received requires expensive precision working within strict tolerances, and an equally precise production of the guide bushing, to ensure that an accurate pressure seat is created. At the same time, sticking of the piston rod in the guide must be prevented and the gap between the guide bushing and the piston rod must be maintained below a certain limit. In serial manufacture of a plurality of these parts, relatively large differences in the size of this gap lead to wide damping force variations, which are not acceptable to vehicle manufacturers. To reduce these variations in damping force, it is known to use an additional sealing ring that is axially movable between two stops. This is expensive to produce and to assemble and does not lead unconditionally to the desired success.

Further, another reference DE 195 01 792 A1 discloses a piston with a piston ring, wherein the piston ring has a width greater than the axial extension of the outer cylindrical surface of the piston. Therefore, there is an overlap of the piston ring on the outer cylindrical surface. The piston ring is drawn securely onto the piston and has no clearance relative to the piston in either the radial or the axial movement direction.

SUMMARY OF THE INVENTION

It is an object of the present invention to provide a guide bushing for a piston rod guide that is simply and economically manufactured, ensures a good seal on a piston rod without reducing damping comfort, and requires little structural space.

The object is attained according to the invention in that the guide bushing is arranged with radial clearance relative to the piston rod guide. The result of this radial clearance is that a gap is created between the receptacle diameter of the piston rod guide and the outer diameter of the guide bushing. The size of the gap varies in response to transverse forces acting between the piston rod and the piston rod guide. The radial clearance allows a loose centering of the guide bushing on the piston rod which provides substantially broader and thus more economical manufacturing tolerances than the previously standard pressure connection. The gap is not located between the piston rod and the guide bushing as in the prior art, but rather, as stated above, it is located between the piston rod guide and the outer diameter of the guide bushing. The gap is advantageously sealed relative to the adjacent areas to the greatest extent possible. The differential pressure that prevails between the spaces is established in the gap, as a result of which the guide bushing is pressed against the piston rod in dependence on the working pressure in the vibration damper. Accordingly, when movement of the vibration damper is initiated, there is low friction on the piston rod. However, the friction on the rod increases as the damping force increases, so that the friction share always remains small in relation to the damping force.

According to the invention, to ensure that the vibration damper functions flawlessly, the maximum width of the variable sized gap between the piston rod guide and the guide bushing is smaller than the permitted radial deflection of the piston rod in a piston rod seal. In the axial direction, the guide bushing is held in the piston rod guide by the arrangement of two stops, which essentially allow only a radial movement of the guide bushing. To minimize the friction on the piston rod, it is advantageous for the guide bushing to comprise a PTFE-coated carrier material. The carrier material may be steel or other metal sheets, tubes or multi-layer materials. The guide bushing may also comprise plastic rings of one or more layers with good gliding characteristics.

A sufficient seating of the guide bushing on the piston rod is attained according to the invention by virtue of the fact that the guide bushing has an impact gap and because the guide bushing is resilient in the circumferential direction, causing the guide bushing to be pressed with low force against the piston rod in a sealing fashion. To prevent unwanted expansion of the guide bushing, the width of the impact gap is limited, according to a feature of the invention, by a slide closing. The guide bushing is designed so that the impact gap begins to close at a predetermined working pressure to limit the friction between the guide bushing and the piston rod.

In another embodiment, the guide bushing comprises an impact gap with a stepped progression in the circumferential direction. This progression is formed by interengaging ends of the guide bushing. In a further embodiment of the guide bushing, the guide bushing has a running surface embodied in a crowned or rounded fashion over the axial length. The crowned running surface reduces the occurrence of greater wear on the upper or lower edge due to unwanted carrying of the bushing.

In another embodiment, the guide bushing is arranged so as to be slightly axially movable between the stops to ventilate a piston-rod-side working space. The stops form a ring groove with the receptacle diameter of the piston rod guide. To make it easier for the gas-liquid mixture collected on the guide in the piston-rod-side working space to emerge into the compensation room, the guide bushing is equipped on its upper face with radial penetration slots, so that this embodiment also acts as a ventilation valve. This multiple function characteristic of the guide bushing is enabled in a simple manner by the fact that the stops which form a ring groove with the receptacle diameter are circular areas on the piston rod guide. The guide bushing is embodied cylindrically and is single-chambered between the stops in the guide bushing. The piston rod guide consists of two interengaging and substantially horizontally divided guide parts. The piston rod guide may also be formed by two sheet parts, each of which has a stop. These sheet parts are connected to each other after placement of the guide bushing.

In a further embodiment according to the invention, the stops comprise radially outward projections on the guide bushing. The connection to the piston rod guide is accomplished by a snap connection. This simplifies the assembly of the guide bushing in the piston rod guide. The projections may also be equipped with joining surfaces. In the arrangement of guide bushings with larger radial projections, the guide bushing may be equipped at one axial end with flexible tongues for facilitating the formation of the snap connection. The guide bushing may also optionally have a shoulder pointing toward the piston-rod-side working space and forming a sealing lip, which is pressed under the action of the differential pressure against the piston rod. Such a design is especially suitable for guide bushings of plastic, which do not need to have an impact gap.

According to a feature of the invention, a further additional check valve function of the guide bushing is enabled by a stop comprising an axial extension of the guide bushing. The extension also includes a ring-shaped valve surface for an elastic sealing ring of a check valve.

To prevent a backup of damping liquid in the gap between the piston rod guide and the guide bushing in certain embodiments of vibration dampers, one or more radial openings are arranged through the wall of the guide bushing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is described in greater detail below in reference to the examples shown in the drawings. The drawings show.

DETAILED DESCRIPTION OF THE PRESENTLY PREFERRED EMBODIMENTS

The structure and manner of operation of a hydropneumatic vibration damper are known in the art. Therefore, only the structure and function of the guide bushing according to the invention are described below. The drawings show only the region of the guide bushing on a two-tube vibration damper. However, guide bushings are also suitable for other applications which include two parts that move axially relative to each other, such as, for example, for guiding a pump piston rod or other components with circular cross-sections.

Figure 1:
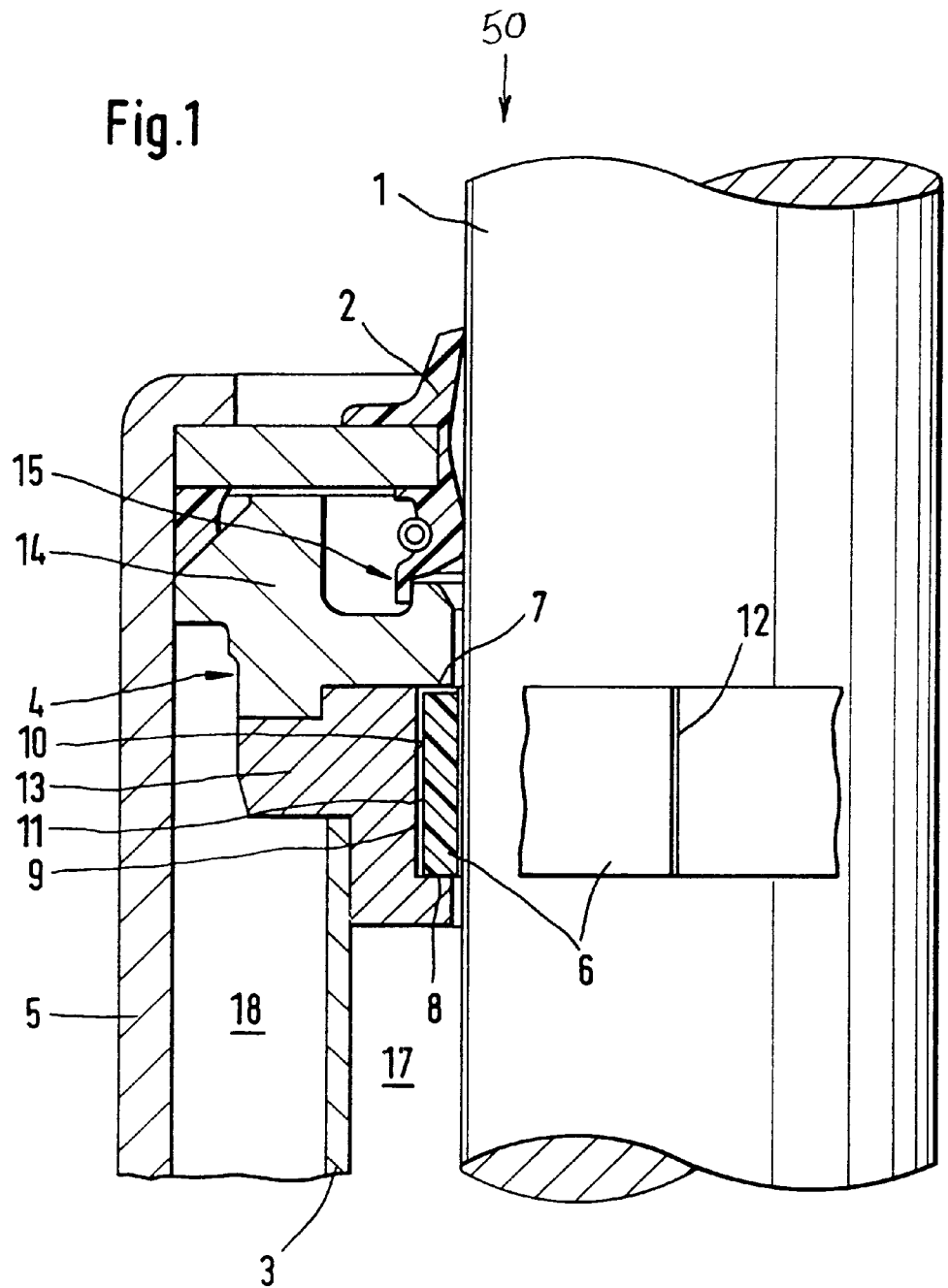
FIG. 1 is a longitudinal sectional view of a two-tube vibration damper in the region of the piston rod guide with an embodiment of a guide bushing according to the invention.

The section of two-tube vibration damper 50 shown in FIG. 1 has a piston rod 1 which is inserted through and held by a piston rod guide 4 that is mounted at an end of a container 5. The piston rod 1 is sealed relative to the outside of the container 5 by a piston rod seal 2 that is arranged on the piston rod guide 4. A cylinder 3 engages into a shoulder of the piston rod guide 4 which comprises a lower part 13 and an upper part 14. The cylinder 3 is centered, with the help of the piston rod guide 4, in the container 5. Arranged between an upper stop 7 and a lower stop 8 formed by the piston rod guide 4 is a cylindrical guide bushing 6, which rests on the piston rod 1. The guide bushing 6 is inserted in the cylinder 3 before the assembly of the two parts of the piston rod guide 4.

The piston rod guide 4 has a receptacle diameter 9 in an area which receives the guide bushing 6. A gap 11 is created by a radial clearance between the outer diameter of the guide bushing 6 and the receptacle diameter 9. The width of the gap 11 is varied by transverse forces acting on the piston rod 1. The maximum width of the gap 11 is less than the permitted radial deflection of the piston rod seal 2. Therefore, even in the event of large transverse forces acting on the piston rod 1, a seal of the piston rod 1 relative to the outside is ensured. To ensure that the guide bushing 6 properly rests on the piston rod 1, the guide bushing 6 comprises an impact gap 12 and is embodied resiliently in the circumferential direction.

A check valve 15 arranged in the piston rod guide 4 prevents gas from passing from a compensation space 18 between the container 5 and the cylinder 3 into the piston-rod-side working space 17 between the piston rod 1 and the cylinder 3 via the piston rod guide 4 or the guide bushing 6 during a pressure stroke of the piston rod 1. To ventilate the piston-rod-side working space 17, the guide bushing 6 is arranged with a slight axial clearance between the stops 7 and 8. In addition, the guide bushing 6 further comprises one or more radial grooves on its upper face, thereby forming a ventilation valve between the guide bushing 6 and the stop 7.

The guide bushing 6 has good gliding characteristics with respect to said piston rod 1. That is, the piston rod 1 is allowed to move smoothly against the guide bushing 6 without a sticking effect when movement is initiated. Materials that may be used to produce the good gliding characteristics include, but are not necessarily limited to, PTFE-coated carrier materials, such as steel or other metal sheets, and plastics.

Figure 2:
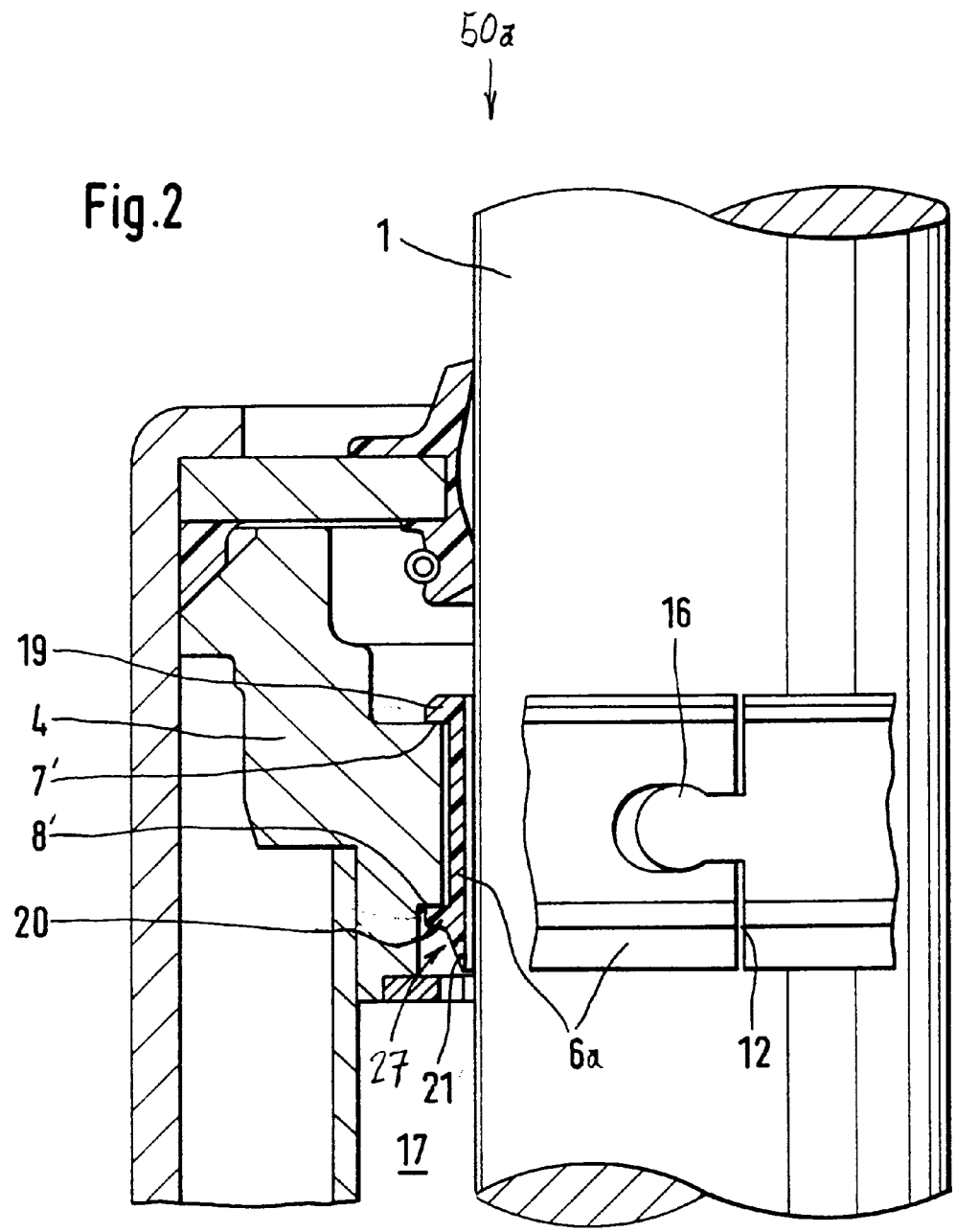
FIG. 2 is a longitudinal sectional view of the two-tube vibration damper with another embodiment of a guide bushing with a slide closing and a sealing lip.

In another embodiment according to the invention, a two-tube vibration damper 50a in FIG. 2 has a guide bushing 6a equipped with a slide closing 16. The slide closing 16 prevents an unwanted expansion of the guide bushing 6a and limits the width of the impact gap 12. The upper stop surface 7' is formed on a one-part piston rod guide 4. The upper stop surface 7' is open at the top and is normal to a longitudinal axis of the piston rod 1. Resting on the upper stop surface 7' is a corresponding counter-surface of a radially outward upper projection 19 of the guide bushing 6a. Similarly, a lower stop surface 8' is formed on the one-part piston rod guide 4. A corresponding surface of the lower radial projection 20 of the guide bushing 6a is supported on the lower stop surface 8'. This guide bushing 6 also has a gap 11 whose width changes in response to transverse forces applied to the piston rod 1. However, the gap 11 is limited axially by the projections 19 and 20. The connection of the guide bushing 6a to the piston rod guide 4 is preferably a snap connection, such that when the guide bushing 6 is inserted into the piston rod guide 4, the projection 19 or 20 latches into the corresponding stop surface. In the radial projections 19 and 20 of the guide bushings 6a are large, flexible tongues formed on an axial end of the guide bushing 6a will facilitate establishing the snap connection. The guide bushing 6a also has a ring-shaped shoulder 27 pointed toward the piston-rod-side working space 17. The shoulder 27 forms a sealing lip 21, which is pressed under the action of the pressure in the working space 17 against the piston rod 1. A guide bushing 6a in this embodiment comprises a closed plastic ring with good gliding characteristics.

Figure 3:
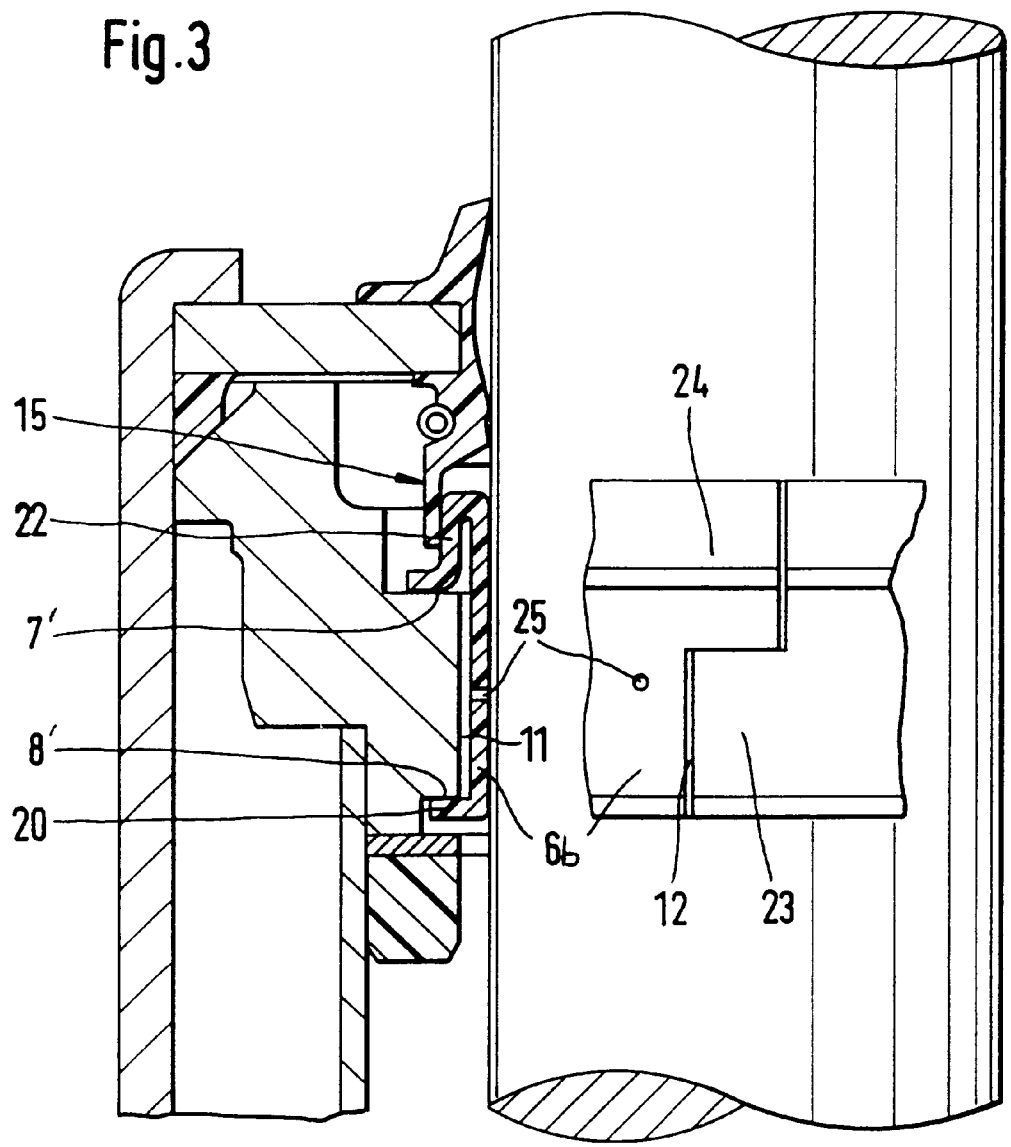
FIG. 3 is a longitudinal sectional view of the two-tube vibration damper with yet another embodiment the guide bushing with an axial extension acting as both a stop and a valve surface.

FIG. 3 shows a two-tube vibration damper 50b having a guide bushing 6b having an axial extension 22, which rests on the upper stop surface 7'. In addition, the axial extension 22 forms a ring-shaped valve surface for the rubber-elastic sealing lip of the check valve 15. One or more radial openings 25 are arranged through a central region of the guide bushing 6b to prevent a possible backup of the damping fluid in the gap 11. Gap 11 also has a width that varies in response to transverse forces acting on the piston rod 1. The impact gap 12 is stepped in the circumferential direction and formed by interengaging ends 23 and 24 of the guide bushing 6b.

Figure 4:
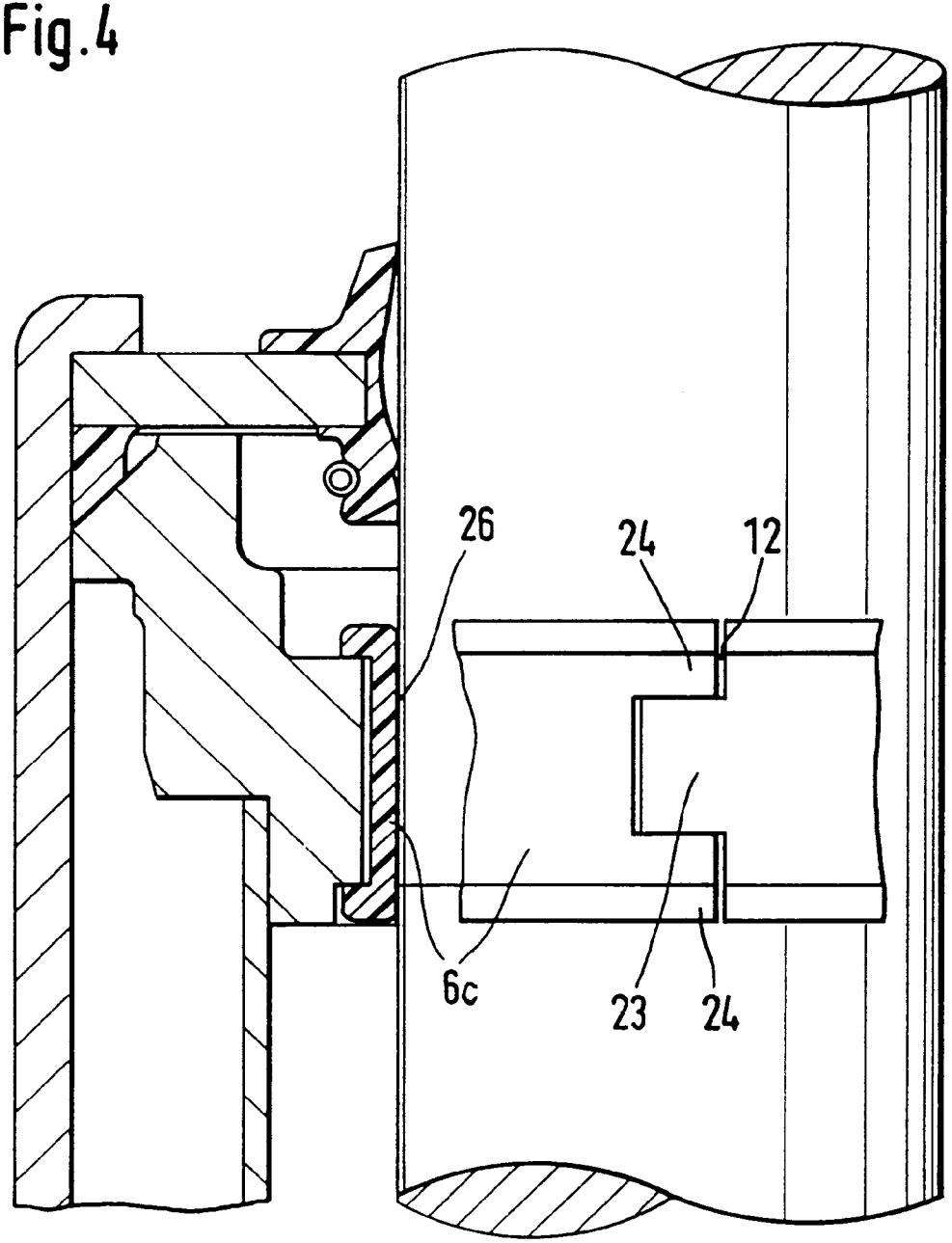
FIG. 4 is a longitudinal sectional view of the two-tube vibration damper with still another embodiment of the guide bushing with a crowned running area.

In another embodiment of the two-tube vibration damper 50c shown in FIG. 4, the guide bushing 6c has a running surface 26 embodied in a crowned or rounded fashion over an axial length of the guide bushing 6c, so that an unwanted carrying of the upper or lower axial ends of the guide bushing 6c and the higher wear associated therewith, are reliably avoided. In this embodiment of the guide bushing 6c, the impact gap 12 is formed with two interruptions. For this purpose, the interengaging end 23 is arranged centrally between the two ends 24.

The invention is not limited by the embodiments described above which are presented as examples only but can be modified in various ways within the scope of protection defined by the appended patent claims.

I claim:

1. A guide bushing assembly mounted between an outer component and an inner component for guiding an axial movement of said inner component relative to said inner component, comprising:

a guide bushing surrounding a perimeter of the inner component;

a guide piece mounted at one end of the outer component having a receptacle diameter for receiving said guide bushing and having an upper stop and a lower stop arranged substantially perpendicular to the axial movement and operatively positioned for preventing axial movement of said guide bushing relative to said guide piece;

said upper stop and said lower stop comprising radially outward projections of the guide piece;

said guide bushing operatively arranged for establishing a snap connection with the guide piece when said guide bushing is inserted into said guide piece;

said guide bushing having an outer diameter operatively sized for producing a gap between the outer diameter and the receptacle diameter of the guide piece in an area between said upper stop and said lower stop;

said guide bushing comprising a material having good gliding characteristics with respect to said inner component; and said guide bushing operatively arranged with respect to said guide piece for varying a width of the gap when said inner component is subjected to transverse forces with respect to said outer component.

2. The guide bushing assembly of claim 1, wherein said guide bushing is further operatively arranged for limiting the width of the gap to a maximum width that is smaller than a radial deflection of said first component allowed by a seal mounted on said outer component.

3. The guide bushing assembly of claim 1, wherein said guide bushing comprises one of a PTFE-coated carrier material and a plastic, the carrier material comprising one of steel and a metal sheet.

4. The guide bushing assembly of claim 1, wherein said guide bushing comprises an impact gap between ends of said guide bushing and said guide bushing is operatively arranged for resiliently resting on the perimeter of the first component.

5. The guide bushing assembly of claim 4, wherein said guide bushing comprises a slide closing at said impact gap operatively connected for limiting a maximum width of the impact gap.

6. The guide bushing assembly of claim 4, wherein said guide bushing is operatively arranged for closing said impact gap at a predetermined maximum pressure in a working space enclosed by said guide bushing and said outer component for limiting friction.

7. The guide bushing assembly of claim 4, wherein said guide bushing comprises interengaging ends operatively arranged for producing a stepped progression in the circumferential direction in said impact gap.

8. The guide bushing assembly of claim 1, wherein said guide bushing comprises a running surface resting against said inner component, and said running surface is one of crowned and rounded along an axial direction.

9. The guide bushing assembly of claim 1, wherein said upper stop and said lower stop each comprise a circular area on the guide piece, and the guide piece comprises two interengaging and substantially horizontally divided guide parts.

10. The guide bushing assembly of claim 1, wherein said guide bushing further comprises a flexible tongue at one axial end operatively connected for facilitating the snap connection.

11. The guide bushing assembly of claim 1, further comprising a ring-shaped shoulder pointing toward a working space enclosed by said outer component and said guide bushing, the shoulder forming a sealing lip operatively connected for pressing against the first component under the effect of pressure in the working space.

12. The guide bushing assembly of claim 1, wherein one of said upper stop and said lower stop comprises an axial extension of said guide bushing, said axial extension further comprising a ring-shaped valve surface operatively connected for providing an elastic sealing ring of a check valve.

13. The guide bushing assembly of claim 1, wherein said guide bushing further comprises radial openings through a wall of the guide bushing.

14. The guide bushing assembly of claim 1, wherein said first component comprises a piston rod, said guide piece comprises a piston rod guide, and said second component comprises a cylinder of a hydropneumatic vibration damper.

* * * * *